June 14, 1938.  A. W. GAY  2,120,700
VULCANIZING MOLD AND METHOD OF MAKING SAME
Filed Aug. 12, 1937
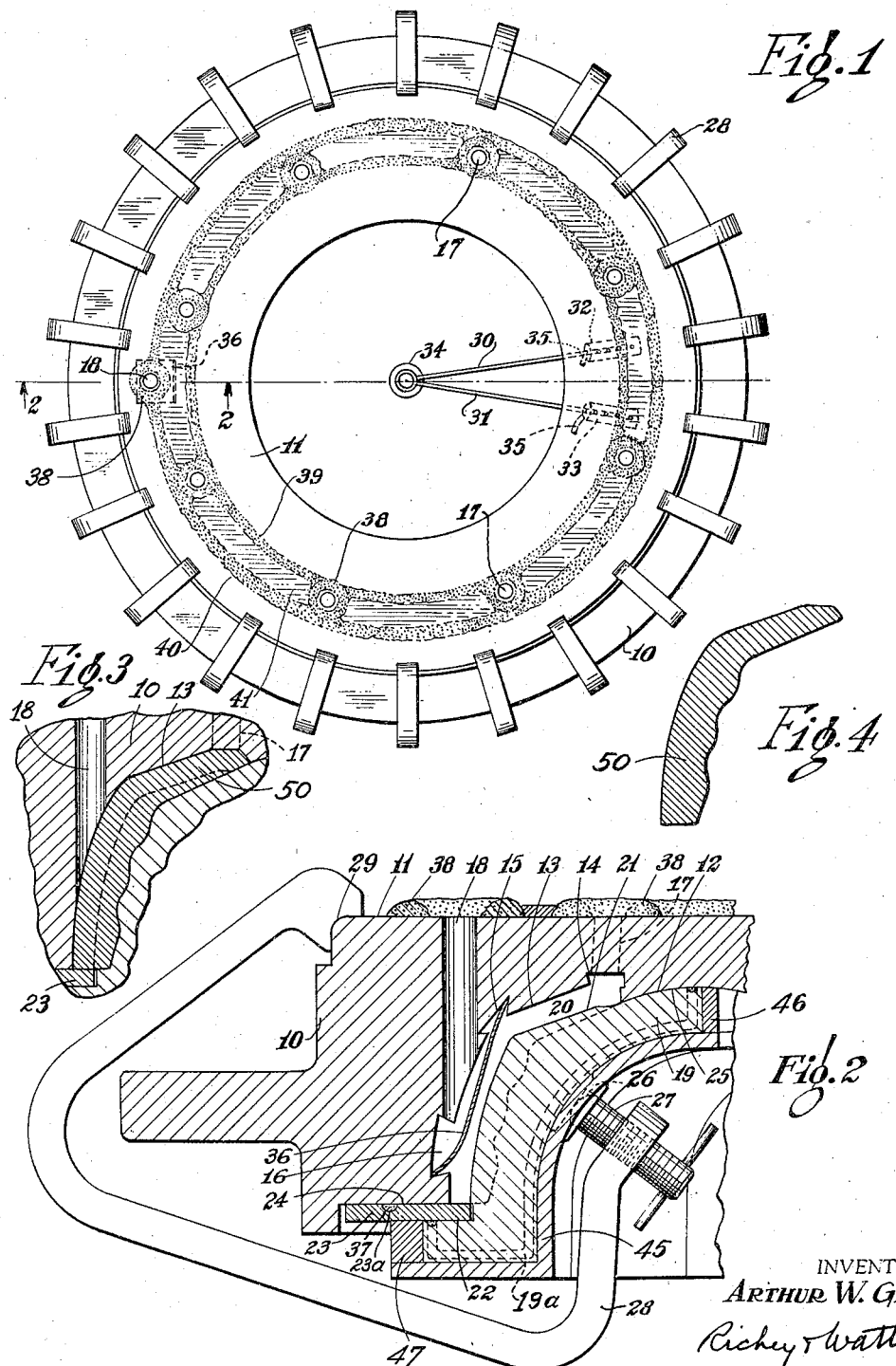
INVENTOR.
ARTHUR W. GAY.
Richey & Watts
ATTORNEY.

Patented June 14, 1938

2,120,700

UNITED STATES PATENT OFFICE 2,120,700

VULCANIZING MOLD AND METHOD OF MAKING SAME

Arthur W. Gay, Akron, Ohio, assignor to The Rapid Mold Company, Akron, Ohio, a corporation of Ohio Application August 12, 1937, Serial No. 158,739

9 Claims. (Cl. 22—212)

This invention relates to new and improved mold members for use in vulcanizing rubber articles and to a new and improved method of making such members.

Molds for use in vulcanizing rubber articles must be sufficiently hard to withstand rather rough handling without having their curing faces nicked, marred or otherwise damaged, should be accurate in all dimensions including the diameter within a few thousandths of an inch, and should have a curing face, i. e. the surface exposed to the rubber, which is so smooth and so free from small pits that rubber particles will not adhere thereto and that the vulcanized article will have a smooth finish free from pits or projections.

The iron or steel molds used heretofore had the requisite hardness and accuracy but did not have the smooth surface desired by the rubber industry. The metal could not be finished with the desired smoothness of surface on the curing face without prohibitive machining and polishing cost.

Efforts have been made to meet the foregoing requirements by employing an iron or steel back part and a face part of another metal or alloy secured thereto as by being cast in place or removably attached. These efforts have been unsuccessful for the molds did not meet the foregoing requirements and did possess inherent disadvantages. The face part metal was usually an alloy which was relatively soft and easily nicked or injured. It could not be cast to a size within the tolerances permitted and thus had to be machined. Whether cast to size or machined the metal did not have the smoothness of finish desired. Moreover the metal had a coefficient of expansion different from the metal of the back part and when cast thereagainst tended to prevent good heat conducting contact with the back part at temperatures within the vulcanizing temperature range. When the alloy part was made in segments, repeated heating and cooling resulted in upsetting of the contacting ends of the segments with ingress of dirt therebetween until marking of the vulcanized article became objectionable. Aluminum alloys were commonly used as the face part metal in those efforts. The hardness obtained with such alloys in mold face parts was not over about 100 Brinell and was usually below about 80 Brinell. The variations in diameter in such castings were on the order of about .2" as contrasted with about .003" which is about the maximum permitted.

According to the present invention, I have been able to overcome the disadvantages previously existing in molds having curing surfaces formed on iron or steel members, as well as in those having aluminum alloy curing surfaces.

I am able to produce a mold member for vulcanizing annular rubber articles in which the curing surface is composed of an aluminum alloy, having a Brinell hardness of above about 110; having a variation in dimensions including the diameter of less than about .003"; and having a finish which is so smooth and free from minute depressions and the like that it has little noticeable tendency to retain rubber particles and is, therefore, capable of imparting an extremely high degree of smoothness of surface to rubber articles vulcanized thereagainst. I have attained all these advantages without any prohibitive cost in manufacture. Mold parts embodying this invention may be made in the form of separate rings and later secured in place in a suitable steel back, or they may be cast in such a back, and in this case the aluminum alloy and the steel parts may press against each other so tightly that they will have a good heat conducting engagement over the entire extent of their opposed surfaces throughout the entire range of vulcanizing temperatures and can thus efficiently transmit heat from one part to the other.

One method for carrying out the present invention and making an article embodying the invention, may be briefly described as including the steps of pouring molten metal, such as aluminum alloy, into an annular casting cavity defined by inner and outer members, while they are heated to a high temperature, for example, near the melting point of the alloy and preferably, in the case of ferrous metal members, to a temperature above the melting point of the alloy; maintaining the temperature of the outer member not far below its temperature at the time pouring begins and maintaining the casting cavity substantially filled with metal while reducing the temperature of the metal to a point far below its melting point and far below the temperature of the outer member, thereby substantially completely filling the casting cavity with solidified alloy; then approximately equalizing the temperature of the solidified metal and the outer member and thereafter, cooling said outer member and the solidified metal slowly and at approximately the same rate to room temperature. When the aforesaid outer member is properly shaped, the thus cast and treated alloy ring may be removed therefrom and used in a mold back machined to receive it. When, however, the outer member is provided with suitable anchorage means on the face thereof against which the alloy metal is cast, that member is permanently secured to the casting and the two parts constitute a composite mold.

The preferred steps for substantially filling the casting cavity with cast metal at a temperature far below its melting point and far below the temperature of the outer member, is as follows:—When the members defining the casting cavity are highly heated, as above specified, the molten alloy metal is poured into the casting cavity, substantially filling it. Then the temperature of a circumferentially short length of the inner member, substantially opposite the pouring gate, is rapidly lowered far below the melting point of the alloy metal, with the result that the metal immediately adjacent that portion of the inner member solidifies and cools to approximately the temperature of that portion of the inner member. Molten alloy metal feeds into the spaces resulting from the shrinkage of the metal during such solidification and cooling and quickly solidifies and similarly shrinks, whereupon additional molten metal fills any resulting spaces so that a circumferentially short portion of the casting cavity is eventually filled substantially completely with alloy metal at a temperature far below its melting point. Then the operation just described is carried out preferably simultaneously on each side of the circumferentially short part of the cavity already filled with cold alloy metal and this operation is progressively repeated until the entire cavity is completely filled with alloy metal at such low temperature. During all this time the outer member has been maintained at a high temperature. Then the temperatures of the casting and the outer member are approximately equalized and allowed to decrease to room temperature.

Figure 1 is a top plan view of apparatus with which the present invention may be practiced, Figure 2 is a fragmentary sectional view taken on the line 2—2 of Figure 1, Figure 3 is a fragmentary sectional view of a modified apparatus for practicing the invention, and Figure 4 is fragmentary sectional view of a mold member embodying the present invention and producable in the apparatus illustrated in Figure 3.

In Figures 1 and 2 of the drawing there is illutrated one form of apparatus which may be employed in using the present invention to produce a composite mold. A ring shaped back 10 is provided having an upper surface 11 and an inner surface 12 formed with a recess or groove 13. The recess 13 has formed therein a plurality of spaced circumferentially extending dove-tailed slots 14, 15, and 16 to provide for anchorage of the face part against displacement. Extending through the back 10 are a plurality of spaced apertures 17 opening into the highest point of the recess 13, which serve as vents or risers. A pouring gate 18 is provided, which extends through the back and opens into the lowermost portion of the recess 13 when the same is disposed in casting position.

The back 10 constitutes the outer member of the assembly into which the alloy metal is poured. An inner member formed, preferably, of a plurality of segments 19 assembled in a ring is clamped in position relative to the outer member. A groove 19a is provided in the abutting surfaces of the segments 19 into which molding sand is placed to provide a seal between adjacent segments. Where it is not desirable to provide the grooves 19a, a plate 45 and rings 46 and 47 may be used to seal the joints between adjacent segments and between the segments and the back 10. The space between the inner surface 12 of the back 10 and the outer surface of the segments 19 provides an annular casting cavity 20 into which the molten alloy metal is poured. As will be understood, the outer surface 21 of each segment 19 may carry a suitable design to be imparted to the face portion of the mold which is cast in the cavity 20.

Although the segments 19 may be supported upon the back 10 in a number of different ways, there is disclosed in the drawing a shoulder 22 formed on each segment 19 for abutment on a positioning ring 23 centered on the lower surface 24 of the back 10. The ring 23 has formed therein a groove 23a into which molding sand may be placed to effect a seal between the ring 23 and the back 10. The opposite side of the segment 19 is formed with a surface 25 complemental to the inner surface 12 of the back 10, so that opposite sides of the segments engage the back to provide the enclosed cavity 20.

The outer surface of each segment 19 is provided with a depression 26 which serves to receive the end of an adjusting screw 27 threaded through one end of a suitable clamp 28 to position the clamp upon the segments as disclosed in Figure 2, during the operation of pouring the alloy metal. The other end of the clamp 28 engages the outer member as at 29.

As illustrated in the drawing the cooling means which is adapted to chill selected areas of the inner member progressively, comprises a pair of rods 30 and 31 rotatably mounted on a central post or pedestal 37. The rods 30 and 31 carry spray heads 32 and 33, respectively, for directing coolant onto the inner radial surface of the inner member, progressively, as the spray heads are moved in opposite directions, around the assembly. The spray heads 32 and 33 are provided with flexible conduits 35 which serve to convey coolant from any suitable source of supply to the spray heads during the movement of the spray heads as above stated.

In practicing the method of the present invention the previously prepared back or outer member 10 is placed upon any suitable supporting means (not shown) with the inner surface 12 thereof uppermost. In front of the pouring gate 17 there is positioned a deflector plate 36 so that when metal is introduced into the cavity 20 through the gate 17 it does not impinge or wash against the surface of the die segments 19. The aligning ring 23 after having the groove 23a filled with molding sand as at 37 is placed upon the surface 24 of the outer member. The segments 19 with the grooves 19a therein filled with molding sand then are assembled to form the inner member and are clamped in position as illustrated in Figure 2 by means of the clamps 28. The segments are uniformly spaced about the periphery of the outer member, after which all joints between and about the segments are treated with molding sand to preclude the escape of any metal from the cavity 20 during the casting operation. The assembly including the outer member 10 with the segments 19 secured in place then is inverted to the position as shown in Figures 1 and 2.

A rim 38 of wet molding sand is formed up around each of the vent holes 17 and around the pouring gate 18, with sufficient margins to hold an ample supply of molten metal to assist in keeping the gate filled during the quenching or cooling of the cast metal. Around the upper surface 11 of the outer member 10, are positioned two rings 39 and 40 of molding sand which serves to form a trough 41 for the reception of molten metal. The inner ring 39 of molding sand is positioned at a point directly above the inner radial margin of the cavity 20, and the outer ring 40 is displaced directly above the outer radial margin of the cavity 20.

The assembly thus prepared is gradually heated to a temperature sufficiently high to dry the molding sand without excessive steaming. The heating may be done in any suitable way, for example, the entire assembly may be introduced into a heating furnace or suitable burners, disposed about the assembly, may be employed. After the molding sand has become dry, the assembly is removed from the furnace and the previously formed trough 41 is filled to a suitable depth with molten alloy metal.

The assembly with the ring of metal disposed on the surface 11 thereof is again introduced into the furnace and the assembly is heated to a high temperature, preferably to a temperature equal to or above that of the melting point of the alloy metal. I have found that a temperature of from 25°–50° F. above the melting point of the alloy metal is suitable in carrying out the invention with ferrous metal members. In cases where either of the inner and outer members is composed of metal which has a melting point near that of the metal to be cast, the temperature of such member or members should be far below the melting temperature of the cast metal, for example 150°–200° F. The assembly then is removed from the furnace and molten alloy metal is poured into the cavity through the gate 18 until all the risers or vents 17 including gate 18 are completely filled.

After a lapse of time sufficient to permit entrapped gases to escape, and with the spray heads of the cooling apparatus moved together and positioned at a point opposite the gate 18, the cooling or quenching operation is started by discharging coolant through the spray heads 32 and 33. The cooling medium is directed upon a circumferentially short length of the inner member. The cast metal at this point is rapidly cooled, solidifies against the inner member and shrinks leaving spaces in the casting cavity. These spaces are filled as they develop with molten metal which flows thereinto from molten metal adjacent thereto and communicating therewith. The molten metal which thus enters such spaces quickly cools, solidifies and shrinks and the small spaces resulting are similarly filled by molten metal until eventually the circumferentially short length of casting cavity at the place of cooling is substantially filled with cast metal at a temperature far below its melting point and also far below the temperature of the outer part. The temperature of such metal may be more than one hundred degrees below its melting point.

It will be understood that care is taken at all times to maintain molten metal in communication with the part of the cavity in which the metal is solidifying. This is conveniently accomplished by keeping the pouring gate filled with molten metal while chilling is in progress and by advancing the chilling in opposite directions toward the gate at such a rate that the metal will strictly speaking chill progressively and will not prevent access of molten metal to shrinkage spaces created in the casting cavity by solidifying and cooling metal.

The coolant is applied at a rate that will reduce the exposed surface of the inner member to room temperature as rapidly as possible but not so rapidly as to distort the segments of the inner member. The coolant is allowed to impinge against the exposed surface of the inner member until the metal disposed in the trough 41 on the surface of the outer member has solidified above the spray heads and the solidification has extended around the trough each way from the spray heads a distance of ½" to 1". Then the spray heads 32 and 33 are moved in opposite directions around the assembly and the foregoing operation is repeated successively on other circumferentially short lengths of the casting cavity at such a rate that they are maintained at substantially the aforesaid distance behind the solidified ends of the ring of molten metal in the trough 41. The two sprays 32 and 33 are moved around the assembly under these conditions until the sprays have met at the gate 17, where they are left on until the metal in the gate has completely solidified. Then the sprays are shut off. If desired, coolant may be delivered against previously cooled parts of the inner member while the heads 32 and 33 are in use, as by providing additional spray heads. In this manner the entire casting cavity is completely filled with cold cast metal.

The locking clamps 28 are then removed. Thereupon the outer part gives up heat to the casting causing it to tend to expand and release the inner member which can then be removed. Then the outer part and the casting are permitted to cool to room temperature.

The tendency of the cast metal to expand radially outwardly and axially when it is allowed to absorb heat from the outer member is opposed by the outer member while the tendency to expand circumferentially is opposed by the cast metal itself and the outer member. As a result of such resistance to expansion, the surface of the cast metal is forced against the outer member under compressive pressure. Further gradual cooling of the outer member, as for example by simple exposure to the air, reduces its temperature below that of the cast metal and keeps it below the temperature of the cast metal and extracts heat therefrom until all parts are down to room temperature, with the result that the initial close fitting, compressive engagement of the cast metal against the outer member is maintained. This engagement will be maintained at all temperatures within the vulcanizing temperature range. Such close fitting compressive engagement will serve to transfer heat from the back to the mold face uniformly and efficiently.

In Figure 3 there is disclosed apparatus in which an annular mold member may be produced in accordance with the present method. This mold member may be seated in a machined recess in a mold back to constitute a mold for use in vulcanizing annular rubber articles. The outer member 10 is formed with the recess 13 in a manner similar to that described with respect to Figure 1. However, the dove-tailed slots 14, 15, and 16 are eliminated so that after the cast mold member 50 has cooled it can be removed from the recess. Figure 4 illustrates a mold member produced in the assembly shown in Figure 3. This mold member 50 is then used in any suitably formed mold back to form a composite mold for use in vulcanizing annular rubber articles.

By the process of the present invention mold members are produced having a curing surface which is so smooth and free from small pits or minute depressions and the like that rubber particles will not adhere thereto, and which is capable of imparting a smooth surface to a rubber article vulcanized thereagainst. Such members are produced to dimensions well within the tolerances required in the rubber industry. The mold member is free from porosity and shrink cracks and is sufficiently hard to withstand the handling incident to vulcanizing rubber articles, for example, tires and the like. Where the metal member is cast in place in a mold back the mold member and mold back press against each other so tightly that a good heat conducting engagement is obtained therebetween over the entire extent of their opposed surfaces throughout the vulcanizing temperatures.

Having thus described my invention what I desire to secure by Letters Patent is defined in what is claimed.

I claim:

1. The method of making a mold member for use in vulcanizing annular rubber articles which includes the steps of bringing molten metal into an annular casting cavity defined by inner and outer members heated to a high temperature, maintaining the temperature of the outer member and maintaining the casting cavity full of metal while reducing the temperature of said metal to far below its melting point and far below the temperature of the outer member, approximately equalizing the temperature of the solidified metal and outer member and cooling said outer member and solidified metal slowly and at approximately the same rate to room temperature.

2. The method of making a composite mold member for use in vulcanizing annular rubber articles which includes the steps of bringing molten metal into an annular casting cavity defined by inner and outer mold members heated to a high temperature, one of the mold members having a surface formed to interlock with said metal when solidified, maintaining the temperature of the outer mold member and maintaining the casting cavity full of metal while reducing the temperature of said metal to far below its melting point and far below the temperature of the outer mold member, approximately equalizing the temperature of the solidified metal and outer mold member and cooling said outer member and solidified metal slowly and at approximately the same rate to room temperature.

3. The method of making a composite mold member for use in vulcanizing annular rubber articles which includes the steps of bringing molten metal into an annular casting cavity defined by inner and outer mold members heated to above the melting point of said molten metal, the outer mold member having its inner surface formed to interlock with said metal when solidified, maintaining the temperature of the outer mold member near the melting point of the metal and maintaining the casting cavity full of metal while reducing the temperature of said metal to far below its melting point, approximately equalizing the temperature of the solidified metal and outer mold member and cooling said outer member and solidified metal slowly and at approximately the same rate to room temperature.

4. The method of making a mold member for use in vulcanizing annular rubber articles which includes the steps of bringing molten metal having a low melting temperature and a high coefficient of expansion, both as compared with ferrous metal, into an annular casting cavity defined by an inner mold member and an outer, ferrous metal, mold member heated to above the melting point of said molten metal, maintaining the temperature of the outer mold member near the melting point of the metal and maintaining the casting cavity full of metal while reducing the temperature of said metal to far below its melting point, approximately equalizing the temperature of the solidified metal and outer mold member and cooling said outer member and solidified metal slowly and at approximately the same rate to room temperature.

5. The method of making a mold member for use in vulcanizing annular rubber articles which includes the steps of bringing molten aluminum alloy into an annular casting cavity defined by inner and outer mold members heated to above the melting point of said alloy, maintaining the temperature of the outer mold member near the melting point of the metal and maintaining the casting cavity full of metal while reducing the temperature of said metal to far below its melting point, approximately equalizing the temperature of the solidified alloy and outer mold member, and cooling said outer member and solidified alloy slowly and at approximately the same rate to room temperature.

6. The method of making a mold member for use in vulcanizing annular rubber articles which includes the steps of bringing molten metal into an annular casting cavity defined by inner and outer mold members heated to above the melting point of said metal, maintaining the temperature of the outer mold member near to the melting temperature of said metal while completely filling a narrow transverse portion of said cavity with solidified metal at a temperature far below its melting point and similarly and successively filling other similar narrow transverse portions of the cavity until the entire cavity is so filled, approximately equalizing the temperature of the solidified metal and outer mold member, and cooling said member and solidified metal slowly to room temperature.

7. The method of making a mold member for use in vulcanizing annular rubber articles which includes the steps of forming an annular cavity between mold members heated to above the melting point of the metal to be cast, filling said cavity with molten metal by introducing such metal thereinto at one point, lowering the temperature of said metal to far below its melting point by rapidly extracting heat from the inner surface thereof beginning at a point opposite said point of introduction and progressing in opposite directions to said point of introduction while introducing molten metal into any spaces resulting from shrinkage of the cooling metal, thereby completely filling said cavity with solidified metal at a temperature far below its melting point, raising the temperature of the metal by conducting heat to the outer surface thereof, and then cooling the metal slowly to room temperature.

8. The method of making a mold member for use in vulcanizing annular rubber articles which includes the steps of forming an annular cavity between inner and outer annular mold members heated to above the melting point of the metal to be cast, filling said cavity with molten metal by introducing such metal thereinto at one point, lowering the temperature of said metal to far below its melting point by rapidly extracting heat from the inner surface thereof at a point opposite said point of introduction, progressively cooling the metal and completely filling the cavity with solidified metal from said point of initial cooling in opposite directions to said point of introduction raising the temperature of the metal by conducting heat to the outer surface thereof, and then cooling the metal slowly to room temperature.

9. The method of making a mold member for use in vulcanizing annular rubber articles which includes the steps of forming an annular cavity between inner and outer annular mold members heated to above the melting point of the metal to be cast, filling said cavity with molten metal by introducing such metal thereinto at one point, lowering the temperature of a portion of said metal to far below its melting point by rapidly extracting heat from the inner surface thereof and completely filling said cavity with solidified metal at a point opposite said point of introduction, controllably and progressively cooling the metal and completely filling the cavity with solidified metal from said point of initial cooling in opposite directions to said point of introduction, raising the temperature of the metal by conducting heat to the outer surface thereof, and then cooling the metal slowly to room temperature.

ARTHUR W. GAY.